United States Patent [19]

Yoshikawa et al.

[11] Patent Number: 4,679,054

[45] Date of Patent: Jul. 7, 1987

[54] PRINT HEAD

[75] Inventors: Yoshitaka Yoshikawa, Hirakata; Masahide Tsukamoto, Nara; Yutaka Nishimura, Kadoma; Hitoshi Ono, Hirakata; Tetsuhiro Sano, Neyagawa, all of Japan

[73] Assignee: Matsushita Electric Industrial Co., Ltd., Osaka, Japan

[21] Appl. No.: 883,017

[22] Filed: Jul. 9, 1986

Related U.S. Application Data

[63] Continuation-in-part of Ser. No. 654,244, Sep. 25, 1984.

[30] Foreign Application Priority Data

| | | | |
|---|---|---|---|
| Sep. 27, 1983 | [JP] | Japan | 58-178537 |
| Sep. 27, 1983 | [JP] | Japan | 58-178536 |
| Sep. 29, 1983 | [JP] | Japan | 58-182126 |

[51] Int. Cl.⁴ .............................................. G01D 15/06

[52] U.S. Cl. ............................... 346/76 PH; 346/155; 346/139 C

[58] Field of Search ................ 346/76 PH, 76 R, 155, 346/74.5, 139 C, 163; 400/118-124; 219/216 PH, 383; 428/901; 156/901, 902; 174/117 M, 111; 361/411, 410; 101/DIG. 13; 427/96, 117, 118

[56] References Cited

U.S. PATENT DOCUMENTS

| | | | |
|---|---|---|---|
| 3,324,232 | 6/1965 | Maines | 174/111 |
| 3,718,936 | 2/1973 | Rice, Sr. | 346/139 C |
| 4,504,340 | 3/1985 | Tummala et al. | 346/139 C |
| 4,504,696 | 3/1985 | Piper | 174/117 M |

OTHER PUBLICATIONS

The Condensed Chemical Dictionary by Hawley, May 21, 1984, p. 121.

*Primary Examiner*—Arthur G. Evans
*Attorney, Agent, or Firm*—Wenderoth, Lind & Ponack

[57] ABSTRACT

A print head with elongate electrical conductors and a fixing member containing hexagonal boron nitride, the elongate electrical conductors being embedded in or laminated on the fixing member and exposed at the tips. Electric signals are applied between the conductors and a printing medium to print thereon images corresponding to the electric signals.

16 Claims, 8 Drawing Figures

FIG.A
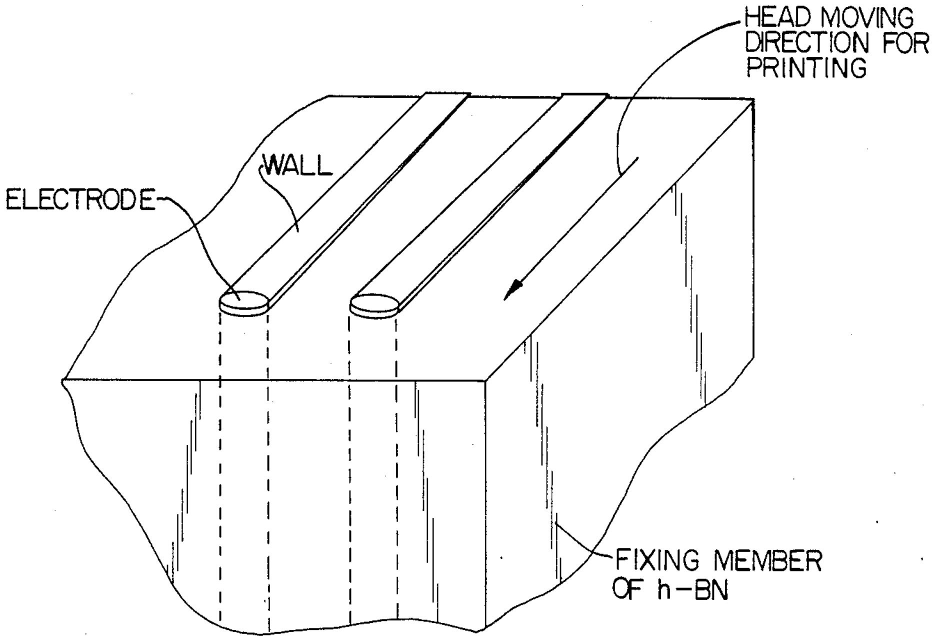

PRINT HEAD

This application is a continuation-in-part, of now abandoned application Ser. No. 654,244, filed Sept. 25, 1984.

BACKGROUND OF THE INVENTION

1. Field of the Invention

This invention relates to a print head for printing onto a printing medium patterns or images converted into electric signals.

2. Description of the Prior Art

Recently, office automation has required various terminals, among which a printing apparatus to convert electric signals into visible images, the so-called printer, has been in great demand so that the printing apparatus of various systems have hitherto been produced.

The printing apparatus using a metal paper or an electrosensitive paper comprising a vapor coated aluminum layer, a black layer and a substrate layer, allows an electrode to contact the vapor coated aluminum layer and applies a voltage to the electrode to remove the vapor coated aluminum layer by means of heating or discharge breakdown so as to expose the black layer for performing printing. Hence, in order to print an image of good quality, printing electrode styluses 11 are projected from a fixing member 12 as shown in FIG. 1-(A) so that the electrode styluses 11 are exactly in contact with a printing paper even after a long time use when the ends of the electrode styluses 11 are worn. In FIG. 1-( A), reference numeral 13 designates lead wires. The fixing member 12 is made of resin. In the case of the print head having electrode styluses not projecting but embedded in the resin as shown in FIG. 1-(B), the end of each of electrode styluses 14 is worn so as to often be out of contact with a printing paper, and the resin around each electrode is broken so that dust created in printing is deposited into the broken resin, resulting in the insulation between the electrodes being deteriorated leading to improper printing. In the case of the print head provided on a alumina ($Al_2O_3$) substrate 15 (which is a hard substrate) with tungsten electrodes 16 as shown in FIG. 1-(C), the electrodes are worn so as to often be out of contact with a printing paper as described above, and since the alumina substrate of the fixing member is hard, it will injure the electrosensitive paper during printing, resulting in improper printing. Therefore, the projecting electrode styluses should be thick and hard and thus it is difficult to produce a multi-stylus print head and a print head enabling high resolution printing.

In order to solve the above described problems, a print head disclosed in U.S. Pat. No. 4,157,554 uses glass tubes providing passageways of fine wire electrodes which are fed by feed rolls to be compensated for wear of the ends thereof. With this print head, however, since the fine wire electrodes are protruded from the glass tubes, the diameter of each wire is limited, and the density of the wire electrodes cannot be increased.

U.S. Pat. No. 4,170,779 discloses a sheathed electrode in which the core is of hard material having a higher melting point (tungsten, for example) than the encasing material, the core being in contact with metal paper. However, although the diameter of the core is reduced, the density of the electrodes cannot be increased.

It is believed impossible to apply the above-described conventional print head to an elongated high density print head such as thermal printer.

Other recording systems, such as electrolytic electrography and electro-carbon-transfer printing (in the Journal of the Institute of Image Electronics Engineers of Japan Vol. 11, No. 1, P3~P9 (1982)), require the same print heads solving the above problems.

SUMMARY OF THE INVENTION

An object of the invention is to provide a print head which is free from the above defect and is capable of performing high resolution printing, and has a long lifetime.

The print head of the invention comprises elongate electric conductors and a fixing member containing hexagonal boron nitride for fixing the electric conductors, the elongate electric conductors being exposed at the utmost ends to be in contact with a printing medium. Electric signals are applied between the conductors and the printing medium to thereby print on the printing medium images corresponding to the electric signals.

The fixing member will be worn during printing so that the electric conductors which are also worn at the ends thereof keep in contact with the printing medium, i.e. the electrodes are worn at substantially the same rate as the fixing means.

The print head of the invention enables the printing superior in printing quality because the insulating material around the electric conductors is prevented from breakdown during printing; because no dust is attached to the insulating material during printing; and because the print head, even when moving in press-contact with the printing medium, does not injure the printing medium. Furthermore, the print head of the invention has electrodes which are not projecting but are embedded into or laminated on the fixing member, so that thin electrodes can be used and length thereof can be freely selected, to obtain a print head of high resolution and of a long lifetime.

The above and other objects and features of the invention will become more apparent from the following detailed description taken in connection with the accompanying drawings, in which:

DESCRIPTION OF THE PREFERRED EMBODIMENTS

Next, embodiments of a print head of the invention will be described with reference to the drawings.

[Embodiment 1]

Figure 1A:
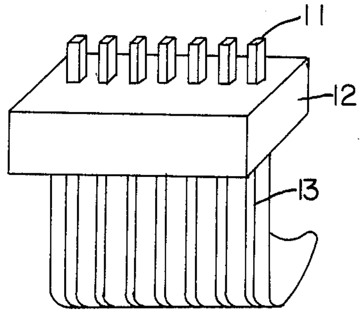
FIG. 1A PRIOR ART
FIG. 1-(A) FIGS. 1-B and FIG. 1-(C) are perspective views of conventional print heads.
Figure 1B:
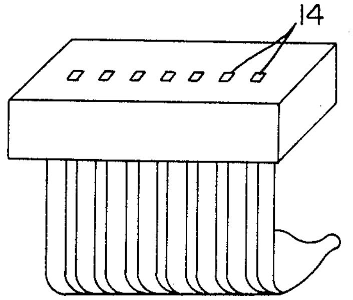
FIG. 1B PRIOR ART
Figure 1C:
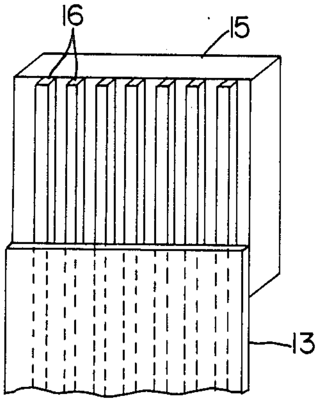
FIG. 1C PRIOR ART
Figure 2:
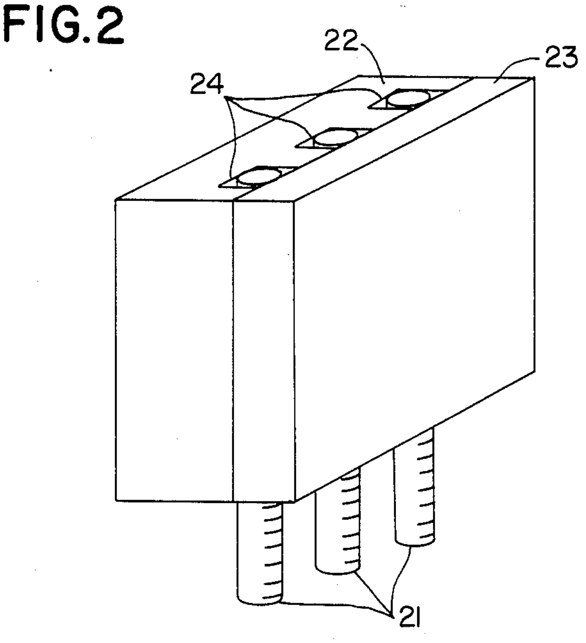
FIG. 2 is a perspective view explanatory of a print head using a hexagonal boron nitride sintered body.

Referring to FIG. 2, the print head of the invention is shown, in which reference numeral 21 designates elongate electrical conductors (for example, copper wires), and 22 and 23 designate fixing member made of sintered bodies of hexagonal boron nitride. The sintered body is, for example, the "Denka Boron Nitride" sintered body manufactured by Denki Kagaku Kogyo Co., Ltd., Japan, the hexagonal boron nitride sintered body 22 of grade HC being provided with grooves 24 of 60 μm in pitch, 65 μm in width, and 60 μm in depth by use of a dicing saw. Covered wires 21 of 60 μm in diameter are respectively embedded into the grooves 24. The sintered body 23 of the hexagonal boron nitride is used to fix the covered wires 21.

This print head, when mounted on a printing apparatus using an electrosensitive paper, carries out printing, and allow electrical conductors 21 keep exactly in contact with the printing medium even after a long time in use, and has the following advantages:

① Superior printing quality (stability in dot form after printing 50,000 characters).

② Dust produced during printing is hard to attach to the head.

③ Printable without injuring the electrosensitive paper.

④ Free from deterioration in the fixing member caused by heat generated during printing.

⑤ Recordable in high resolution.

These advantages are due to the properties of hexagonal boron nitride superior in lubricity, heat-resistance, electric insulation, law wear-resistance, and workability.

In this embodiment, the covered copper wires are used as the electric conductors, but alternatively, bare wires may also be used. However, since the pitch between the electric conductors is restricted as the print head becomes high in resolution, the wiring need be processed while paying attention on contacts of electrical conductors with each other when not covered by electric insulator. It is easy for wiring process to use the conductors covered with electrical insulators. This consideration is applied to the following embodiments using covered copper wires as wire material for electrical conductors.

[Embodiment 2]

Sintered bodies of hexagonal boron nitride, as the fixing member of the same print head construction as in embodiment 1, respectively containing hexagonal boron nitride of 65, 70, 75, 80, 85, 95, 99 (other components being $B_2O_3$, CaO, $SiO_2$ or $Al_2O$) and 100 wt. % were provided and the same method as the embodiment 1 was used to obtain the print heads. The print heads were tested in performance by printing characters onto the electrosensitive paper. The results of evaluation are shown in Table 1.

TABLE 1

| | Evaluation of Print Head for h-BN Content | | | | | | | | |
|---|---|---|---|---|---|---|---|---|---|
| h-BN Content wt. % | 65 | 70 | 75 | 80 | 85 | 90 | 95 | 99 | 100 |
| Print Quality | x | Δ | o | o | o | o | o | o | o |
| Cleanliness | o | o | o | o | o | o | o | o | o |
| Hardness | x | Δ | o | o | o | o | o | o | o |
| Uninflammability | o | o | o | o | o | o | o | o | o |
| Workability | o | o | o | o | o | o | o | o | Δ |
| Total Evaluation | x | Δ | o | o | o | o | o | o | Δ |

where h-BN: Hexagonal Boron Nitride

"Print quality" in Table 1 is evaluation of stability in dot form after printing 50,000 characters. Cleanliness is an evaluation of the dirt on the tips of print heads after printing 50,000 characters. "Hardness" is an evaluation of whether or not the electrosensitive paper is printable without being injured. "Uninflammability" conforms to the UL Standard 94 and is evaluated by a specimen 1/16 inch in thickness. "Workability" evaluates easiness to produce the sintered body and to machine the print head.

As seen from Table 1, for the content of 65 wt. % of hexagonal boron nitride, the fixing member injured the electrosensitive paper during printing, thereby deteriorating print quality. For the content of 70 wt. % of the same, the electrosensitive paper was not injured by the sintered fixing member, thereby being superior in print quality. For the content of 70 wt. %, however, the electrosensitive paper might sometimes be injured due to contact of print head with the electrosensitive paper. Since the fixing member in the content of 100 wt. % of difficult to sinter the sintering condition therefore requires higher temperature and pressure than other sintered bodies), it is preferable to use the hexagonal boron nitride sintered body in the content of 75 to 99 wt. % of hexagonal boron nitride.

[Embodiment 3]

This embodiment of the print head of the invention is same in construction as the embodiment 1, which uses a mold of a hardened mixture of hexagonal boron nitride with thermosetting resin (for example, the mixture of Denka Boron Nitride Powder manufactured by Denki Kagaku Kogyo Co., Ltd. with epoxy resin) serving as the fixing member. The print head is so constructed that the mold (containing hexagonal boron nitride of 60 wt. %) of a hardened mixture of hexagonal boron nitride powder of the grade GP: Denka Boron Nitride Powder by Denki Kagaku Kogyo Co., Ltd., with epoxy resin (bisphenol A type resin) is provided with grooves each of 100 μm in pitch, 65 μm in width and 60 μm in depth by use of a dicing saw. Covered copper wires of 60 μm in diameter are embedded as the elongate electrical conductors into the grooves respectively. Thereafter a mold of mixture of hexagonal boron nitride with epoxy resin and equivalent to the aforesaid mold is used to fixedly press the covered copper wires.

The thus obtained print head has the same advantages as described in embodiment 1.

Next, the print heads using, as the fixing member, the molds which contain hexagonal boron nitride of 0, 10, 20, 30, 40, 50, 60, 70, 80, 90 or 95 wt. %, respectively, mixed with epoxy resin and hardened, were mounted onto the printing apparatus using the electrosensitive paper. Evaluation of the results of this experiment is shown in Table 2.

TABLE 2

| | Evaluation of Print Head related to h-BN Content | | | | | | | | | | |
|---|---|---|---|---|---|---|---|---|---|---|---|
| h-BN Content % | 0 | 10 | 20 | 30 | 40 | 50 | 60 | 70 | 80 | 90 | 95 |
| Print Quality | x | x | Δ | o | o | o | o | o | o | o | — |
| Cleanliness | x | x | Δ | o | o | o | o | o | o | o | — |
| Hardness | Δ | Δ | o | o | o | o | o | o | o | o | — |
| Uninflammability | x | x | x | Δ | o | o | o | o | o | o | — |
| Workability | o | o | o | o | o | o | o | o | o | Δ | x |
| Total Evaluation | x | x | Δ | Δ | o | o | o | o | o | Δ | x |

where h-BN: Hexagonal Boron Nitride

In Table 2, the print quality, cleanliness, hardness, uninflammability and workability are evaluated similarly to embodiment 1. As seen from Table 2, for the hexagonal boron nitride content of 10 or less wt. %, surroundings of electrodes, as described in the conventional example, are broken by the heat generated during printing so that dust produced during printing is attached to the electrodes, thereby creating deformation or disconnection of the conductors to make the print head unusable. Also, when the content of hexagonal boron nitride exceeds 95 wt. %, the mold is not obtainable (broken to pieces), whereby the print head has not been evaluated.

From the above, the print head using the fixing member comprising a mold containing 20 to 90 wt. % of hexagonal boron nitride is suitable for use. Preferably, the print head with the fixing member of the mold containing 40 to 80 wt. % of hexagonal boron nitride is remarkably effective.

[Embodiment 4]

Figure 3:
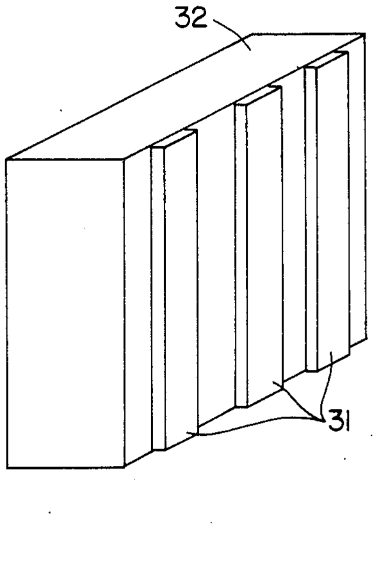
FIG. 3 is a perspective view explanatory of a print head using a mold of a mixture of hexagonal boron nitride with thermosetting resin.

FIG. 3 is a perspective view of the fourth embodiment of the invention, in which reference numeral 31 designates electrical conductors (of, for example, copper) each of a stripe shape, and 32 designates a mold of hardened mixture of hexagonal boron nitride with thermosetting resin (for example, Denka Boron Nitride Powder by Denki Kagaku Kogyo Co., Ltd. with epoxy resin). The print head shown in FIG. 3 is so constructed that a hardened mold of mixing hexagonal boron nitride powder with epoxy resin (the mold containing hexagonal boron nitride with 60 wt. %), is laminated of copper at 35 μm in thickness by means of electroless plating, and thereafter the stripe electrodes (of 50 μm in interval and 50 μm in width) are formed by photo-etching.

This print head, when mounted on the printing apparatus using electrosensitive paper, has the same characteristics as in embodiment 1.

Next, molds produced by mixing epoxy resin with hexagonal boron nitride at the content of 0, 10, 20, 30, 40, 50, 60, 70, 80, 90 or 95 wt. % were hardened, to form the fixing member, and were employed to form print heads. These print heads were subjected to the print test by using the electrosensitive paper. The results of evaluation of the print head are the same as for embodiment 3.

[Embodiment 5]

Figure 4A:
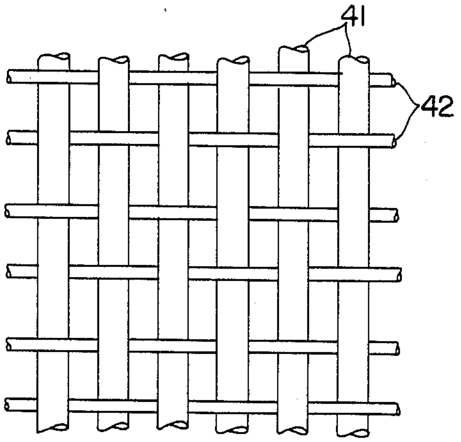
FIG. 4-(*a*) and FIG. 4-(*b*) are perspective views of modified embodiments of the invention.
Figure 4B:
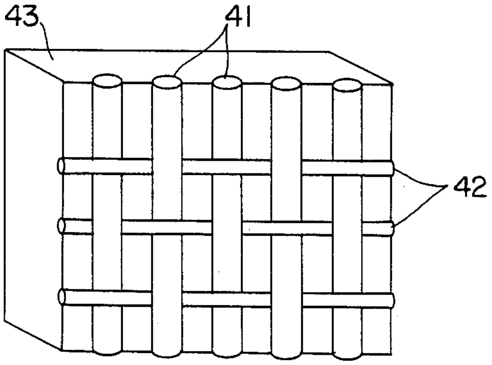

FIG. 4-(*a*) is a front view of a cloth-like member, in which reference numeral 41 designates electrical conductors (for example, copper wires) and 42 designates electrical insulators (of, for example, polyester), which is easily obtainable by using the ordinary weaving machine. FIG. 4-(*b*) shows a print head using the cloth-like member, in which reference numeral 41 designates electrical conductors (of, for example, copper), 42 designates electrical insulators (of, for example, polyester), and 43 designates a mold of mixing hexagonal boron nitride with thermosetting resin (mixing, for example, Denka Boron Nitride Powder by Denki Kagaku Kogyo Co., Ltd. with epoxy resin) and hardened. Each of the electrical conductors is a copper wire of 50 μm in diameter and each of the electrical insulators is a polyester string of 20 μm in diameter, pitch between each two electrical conductors being 100 μm. The cloth-like member is laminated on a mold 3 mm in thickness of mixture of hexagonal boron nitride (in the content of 60 wt. %) with epoxy resin (bisphenol A type resin) so that the sheet-like mold is hardened and simultaneously the cloth-like member is fixed thereto. Then, the mold is shaved to expose the utmost ends of the electrical conductors, thereby providing a print head of 10 conductors per millimeter. The print head is mounted to the printing apparatus using the electrosensitive paper and is used for printing, the head having same characteristics as the embodiment 1. Next, the print heads using, as the fixing member, molds of a mixture of epoxy resin with hexagonal boron nitride in the content respectively of 0, 10, 20, 30, 40, 50, 60, 70, 80, 90 and 95 wt. %, were provided. These print heads were subjected to print test by using the electrosensitive paper for printing thereon. The results of evaluation of the print heads are for same as the embodiment 3.

[Embodiment 6]

A modified embodiment of a print head of the invention is provided which is the same in construction as embodiment 1, and uses a mold as the fixing member for elongate electrical conductors, the mold comprising a mixture of hexagonal boron nitride and talc mixed with thermosetting resin (for example, Denka Boron Nitride Powder by Denki Kagaku Kogyo Co., Ltd., talc powder by Nihon Talc Co., Ltd., Japan, and epoxy resin) and being hardened. The print head is so constructed that a mixture of Denka Boron Nitride Powder of grade GP manufactured by Denki Kagaku Kogyo Co., Ltd., talc powder of purity of at least 99% manufactured by Nihon Talc Co., Ltd., is mixed with epoxy resin (bisphenol A type resin) and hardened to form a mold (containing 60 wt. % of the mixture of hexagonal boron nitride and talc hexagonal boron nitride in the content of 25 wt. %) so that the mold is provided with grooves of 100 μm in pitch, 65 μm in width and 60 μm in depth by use of the dicing saw. Covered copper wires are embedded as the elongate electrical conductors, so that a mold equivalent to the mold of a mixture of hexagonal boron nitride, talc and epoxy resin, presses the covered copper wires and fixes them.

This print head has the same characteristic as embodiment 1 when mounted on print apparatus using the electrosensitive paper for printing.

Since the hexagonal boron nitride is superior in characteristics, but is an expensive material, the print head becomes expensive to produce. On the other hand, talc is inexpensive but somewhat inferior to hexagonal boron nitride in characteristics. Hence, the hexagonal boron nitride and talc were combined so that a mixing ratio to satisfy both the desired characteristics and manufacturing cost was found.

The mold of hexagonal boron nitride and talc in a different mixing ratio and contained in epoxy resin, was used as the fixing member to thereby obtain the print head by the aforesaid method. The print head was mounted on the printing apparatus using electrosensitive paper so that an optimum mixing ratio of hexagonal boron nitride and talc was studied and evaluated. The results of the evaluation are shown in Table 3. The table 3 is checked to items as Table 2and show the total evaluation.

TABLE 3

| | Evaluation as Print Head in relation to Mixing Ratio of Hexagonal Boron Nitride and Talc | | | | | | |
|---|---|---|---|---|---|---|---|
| | Talc Content | | | | | | |
| | 5 | 10 | 20 | 30 | 40 | 45 | 50 |
| Hexagonal Boron Nitride Content | | | | | | | |
| 5 | x | x | Δ | o | o | o | o |
| 10 | x | x | o | o | o | o | o |
| 20 | Δ | o | o | o | o | o | o |

TABLE 3-continued

Evaluation as Print Head in relation to Mixing Ratio of Hexagonal Boron Nitride and Talc

| | Talc Content | | | | | | |
|---|---|---|---|---|---|---|---|
| | 5 | 10 | 20 | 30 | 40 | 45 | 50 |
| 30 | o | o | o | o | o | o | o |
| 40 | o | o | o | o | o | o | Δ |
| 45 | o | o | o | o | o | Δ | x |
| 50 | o | o | o | o | Δ | x | x |

In Table 3, when the total content of hexagonal boron nitride and talc is 20 or less wt. %, the surroundings of the electrodes, as described in the conventional example, are broken by the heat generated during printing and dust produced during printing is attached to the print head to cause deformation or disconnection of the electrode, thereby making the print head unusable. Also, when the total content of hexagonal boron nitride and talc exceeds 95 wt. %, the mold is not obtainable (broken to pieces), whereby the print head was impossible to be evaluated.

From the above, it is preferable to produce the print head by using, as the fixing member, the mold of hexagonal boron nitride and talc in a total content of 25 to 90 wt. %. In a case where the print heads use, as the fixing member, molds having a content of hexagonal boron nitride of less than 5 wt. % and a content talc of 20 or more wt. %, the superior characteristics of hexagonal boron nitride were not useful, but when the content of hexagonal boron nitride was 5 or more wt. %, the characteristics of hexagonal boron nitride were found to be effective.

In other words, a mold containing at least 5 wt. % of hexagonal boron nitride and the total content of 25 to 90 wt. % of mixture of a hexagonal boron nitride and talc is desirably used as the fixing member.

[Embodiment 7]

This embodiment is the same in construction as embodiment 3, in which the print head used, as the fixing member, a mold of hardened mixture of hexagonal boron nitride, talc and thermosetting resin (for example, Denka Boron Nitride Powder by Denki Kagaku Kogyo Co., Ltd., talc powder by Nihon Talc Co., Ltd., and epoxy series resin). The print head is so constructed that the mixture of Denka Boron Nitride Powder of grade GP and talc powder of purity of 99 or more % by Japan Talc Co., Ltd. is mixed with epoxy resin (bisphenol A type resin) and then hardened to form a mold (a mixture of hexagonal boron nitride and talc in the content of 60 wt. %, the content of hexagonal boron nitride being 25 wt. %). The mold is laminated to copper of 35 μm in thickness by means of electroless plating, and thereafter stripe electrodes (of 50 μm in interval and 50 μm in width) are formed by photo-etching.

This print head, when mounted on the printing apparatus using the electrosensitive paper for printing, has the same advantages as embodiment 1. The mixing ratio of hexagonal boron nitride and talc was evaluated to be the same as that of embodiment 7.

[Embodiment 8]

Another modified embodiment of the print head, which is the same in construction as embodiment 4, and employs a cloth-like member, which is woven from electrical conductors for one of warp and woof and woven of electrical insulators for the other. The electrical conductors use copper wires of 50 μm in diameter and the electrical insulators are polyester to thereby form the cloth-like member. The pitch of the electrical conductors is 100 mm. The cloth-like member is laminated on a sheet mold of 3 mm in thickness, comprising a mixture of hexagonal boron nitride of grade GP: Denka Boron Nitride Powder by Denki Kagaku Kogyo Co., Ltc. and talc powder in a purity of 99 or more % and epoxy resin (bisphenol A type resin) mixed with the mixture, so that the sheet mold is hardened and simultaneously the cloth-like member is fixed thereof. The sheet mold contained 60 wt. % of the mixture of hexagonal boron nitride and talc (the content of hexagonal boron nitride being 25 wt. %). After the sheet mold is fixed on the cloth-like member, the fixing member is shaved so that the tips of electrical conductors are exposed to thereby have obtained print heads of 10 electrodes per millimeter. The print head, when mounted on the printing apparatus using the electrosensitive paper for printing, has the same advantages as those of embodiment 1. The result of evaluation of the mixing ratio of hexagonal boron nitride and talc was the same as for embodiment 7.

In addition, embodiments of the print head for the printing apparatus using electrosensitive paper have been described, but the print heads of the invention can be applied to other printing apparatus. For example, the print head of the invention is applicable to a printing apparatus using an electrosensitive medium, electrolytic electrography medium, or electro-carbon-transfer medium, for the printing medium. The electrical conductors are not limited to copper, but may be other electrical conductors such as stainless steel, nickel, tungsten, and molybdenum.

Figure 5:
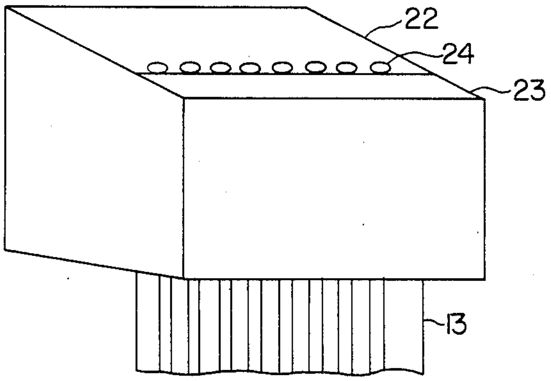
FIG. 5 is a perspective view of another modified embodiment of the invention.

Further, in the foregoing embodiments, it is more preferable to make tapered the surface of the fixing member in contact with the printing medium so as to assure the good contact with the printing medium, as shown in FIG. 5.

Although several embodiments have been described, they are merely exemplary of the invention and not to be construed as limiting, the invention being defined solely by the appended claims.

What is claimed is:

1. A print head for printing on a printing medium an image corresponding to an electric signal, comprising:

elongated electrical conductors to which said electric signal is applied; and fixing means for fixing said electrical conductors so that one end of each of said electrical conductors is exposed at a surface of said fixing means to be in contact with said printing medium.

wherein said fixing means is made of a sintered body containing hexagonal boron nitride so that both of said surface of said fixing means and said end of each of said electrical conductors are worn during printing, thereby keeping said end of each of said electrical conductors in contact with said printing medium.

2. The print head according to claim 1, wherein said electrical conductors are in the form of wire rods embedded in said fixing means.

3. The print head according to claim 2, wherein said wire rods are respectively covered with electrical insulators.

4. The print head according to claim 1, wherein said electrical conductors are in the form of stripe plates laminated on said fixing means.

5. The print head according to claim 1, wherein said electrical conductors are in the form of a cloth-like member, which is woven of electrical conductive threads for one of warp and woof and of electrical insulative threads for the other.

6. A print head for printing on a printing medium an image corresponding to an electric signal, comprising:

elongated electrical conductors to which said electric signal is applied; and fixing means for fixing said electrical conductors so that one of each of said electrical conductors is exposed at a surface of said fixing means to be in contact with said printing medium, wherein said fixing means is a molded body comprising hexagonal boron nitride and thermosetting resin so that both of said surface of said fixing means and said end of each of said electrical conductors are worn during printing, thereby keeping said end of each of said electrical conductors in contact with said printing medium.

7. The print head according to claim 2, wherein said electrical conductors are in the form of wire rods embedded in said fixing means.

8. The print head according to claim 1, wherein said electrical conductors are in the form of stripe plates laminated on said fixing means.

9. The print head according to claim 1, wherein said electrical conductors are in the form of a cloth-like member, which is woven of electrical conductive threads for one of warp and woof and of electrical insulative threads for the other.

10. A print head for printing on a printing medium an image corresponding to an electric signal, comprising:

elongated electrical conductors to which said electric signal is applied; and fixing means for fixing said electrical conductors so that one end of each of said electrical conductors is exposed at a surface of said fixing means to be in contact with said printing medium, wherein said fixing means is a molded body comprising thermosetting resin and a mixture of hexagonal boron nitride and talc so that both of said surface of said fixing means and said end of each of said electrical conductors are worn during printing, thereby keeping said end of each of said electrical conductors in contact with said printing medium.

11. The print head according to claim 10, wherein said electrical conductors are in the form of wire rods embedded in said fixing means.

12. The print head according to claim 10, wherein said electrical conductors are in the form of stripe plates laminated on said fixing means.

13. The printing head according to claim 10, wherein said electrical conductors are in the form of a cloth-like member, which is woven of electrical conductive threads for one of warp and woof and of electrical insulative threads for the other.

14. The print head according to claim 1, wherein the content of said hexagonal boron nitride is 75 to 99 weight percent.

15. The print head according to claim 6, wherein the content of said hexagonal boron nitride is 20 to 90 weight percent.

16. The print head according to claim 10, wherein the content of hexagonal boron nitride is at least 5 weight percent.

* * * * *